No. 775,735. PATENTED NOV. 22, 1904.
C. DE L. RICE.
MACHINE ELEMENT.
APPLICATION FILED FEB. 11, 1904.

NO MODEL.

Witnesses:

Inventor:
Charles D. Rice,
By his Attorney

No. 775,735. Patented November 22, 1904.

UNITED STATES PATENT OFFICE.

CHARLES DE LOS RICE, OF HARTFORD, CONNECTICUT.

MACHINE ELEMENT.

SPECIFICATION forming part of Letters Patent No. 775,735, dated November 22, 1904.

Application filed February 11, 1904. Serial No. 193,139. (No model.)

*To all whom it may concern:*

Be it known that I, CHARLES DE LOS RICE, a citizen of the United States of America, residing at Hartford, in the county of Hartford and State of Connecticut, have invented certain new and useful Improvements in Machine Elements, of which the following is a specification.

This invention relates to the class of devices commonly known as "keys," "feathers," &c., by means of which a pulley or similar element is connected with a shaft to drive it rotarily; and the object of the invention is to produce a device of this kind having features of novelty and advantage.

The invention is adapted for a great variety of uses, but is shown and described herein as applied to drill-press construction to connect the spindle with its pulley.

Figure 1:
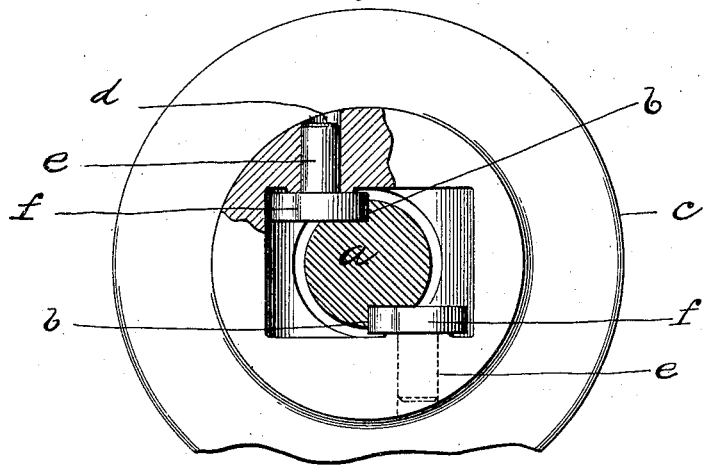
Figure 2:
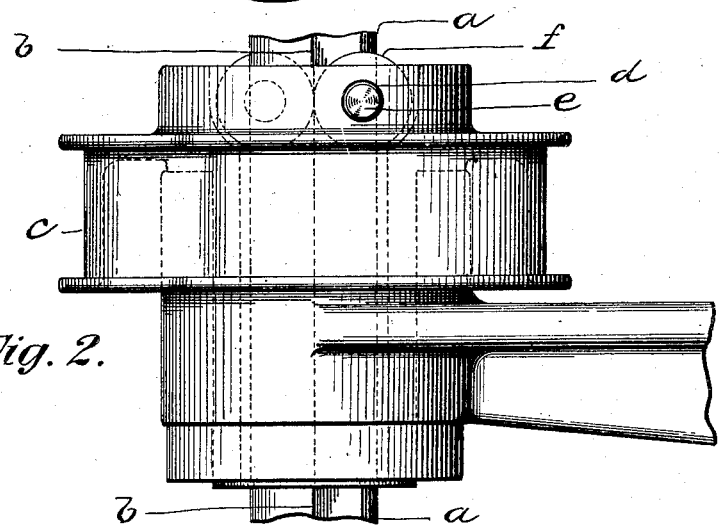
Figure 3:
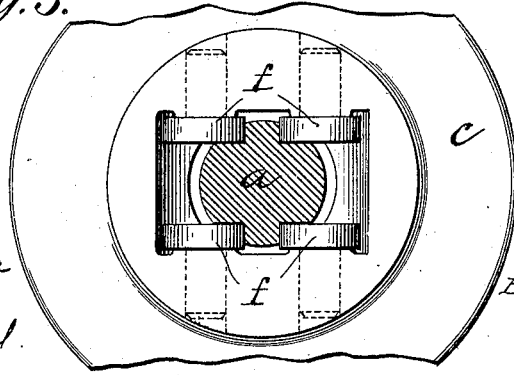

In the drawings, Figure 1 is a side elevation showing the frame and pulley in central vertical section. Fig. 2 is a plan view of the key and the spindle.

Referring to the drawings, $a$ is a spindle cut away on each side, forming the oppositely-disposed shoulders $b$.

$c$ is the pulley, in the upper end of which is secured the plate $d$, having a central opening $d'$ and studs $d^2$, which project into said opening, said studs preferably having a driving fit in suitable apertures in the plate. On the ends of these studs are rotatably mounted rollers $e$, which are of sufficient diameter and so arranged that their peripheries engage the oppositely-disposed shoulders $b$ on the spindle. The axes of the studs on which the rollers are mounted are parallel to the plane of contact between the rollers and the spindle. During the working feed of the spindle the driving effect of the rollers is on the radial shoulders, and the strain on the rollers is in a direct line with their rotary support.

It results from this construction and arrangement of the parts that all cramping of the rollers on their journals is eliminated, and during the downward movement of the spindle through the pulley the rollers or keys have a true rolling contact with the spindle. There is also provided by this arrangement of the two rollers a balanced driving feature which prevents any cramping of the spindle in its sleeve.

I claim as my invention—

1. In combination a shaft having radial shoulders, a pulley mounted on said shaft, and rollers supported by said pulley with their peripheries bearing on said radial shoulders, the axes of said rollers being parallel to the line of contact between the rollers and said radial shoulders, substantially as described.

2. In combination a shaft, a pulley mounted thereon, said shaft being movable lengthwise through said pulley and having oppositely-disposed radial shoulders extending lengthwise thereof, and rollers suitably supported by said pulley and having peripheral contact with said radial shoulders, the axes of said rollers being parallel to the line of contact of the rollers with said radial shoulders.

3. In combination a shaft, a pulley mounted thereon, said shaft being movable lengthwise through said pulley and having oppositely-disposed radial shoulders extending lengthwise thereof, studs carried by said pulleys, and rollers rotatably mounted on said studs and having peripheral contact with said radial shoulders, the axes of said studs being parallel to the line of contact of the rollers with said radial shoulders.

4. The combination with the spindle having radial shoulders and a pulley through which said spindle is free to move lengthwise, of a plate carried by said pulley, studs mounted in said plate with their axes substantially parallel to the radial shoulders on the spindle, and rollers rotatably mounted at the ends of the studs and having peripheral engagement with the radial shoulders on said spindle, substantially as described.

In testimony whereof I affix my signature in presence of two witnesses.

CHARLES DE LOS RICE.

Witnesses:
H. E. HART,
D. I. KREIMENDAHL.